US012749854B2

(12) United States Patent
He

(10) Patent No.: US 12,749,854 B2
(45) Date of Patent: Sep. 29, 2026

(54) MIDDLE CLAMPING PIECE AND HIGH-SPEED CONNECTOR

(71) Applicant: DONGGUAN QIFAN PRECISION HARDWARE AND PLASTIC CO., LTD, Dongguan (CN)

(72) Inventor: Tao He, Dongguan (CN)

(73) Assignee: DONGGUAN QIFAN PRECISION HARDWARE AND PLASTIC CO., LTD, Dongguan (CN)

( * ) Notice: Subject to any disclaimer, the term of this patent is extended or adjusted under 35 U.S.C. 154(b) by 336 days.

(21) Appl. No.: 18/396,933

(22) Filed: Dec. 27, 2023

(65) Prior Publication Data

US 2025/0202165 A1 Jun. 19, 2025

(30) Foreign Application Priority Data

Dec. 13, 2023 (CN) ......................... 202311722820.7

(51) Int. Cl.
*H01R 13/6471* (2011.01)
*H01R 4/2433* (2018.01)
*H01R 13/514* (2006.01)

(52) U.S. Cl.
CPC ....... *H01R 13/6471* (2013.01); *H01R 4/2433* (2013.01); *H01R 13/514* (2013.01)

(58) Field of Classification Search
CPC .............. H01R 13/6471; H01R 13/514; H01R 13/6585; H01R 13/6588; H01R 4/2433
USPC .................... 439/79, 607.05, 607.08, 607.12
See application file for complete search history.

(56) References Cited

U.S. PATENT DOCUMENTS

| | | | | |
|---|---|---|---|---|
| 9,673,552 B2 * | 6/2017 | Tsai | H01R 13/405 |
| 9,843,141 B2 * | 12/2017 | Peng | H01R 13/6581 |
| 10,084,244 B1 * | 9/2018 | Chang | H01R 13/6582 |
| 10,320,125 B2 * | 6/2019 | Ju | H01R 12/724 |
| 10,439,308 B2 * | 10/2019 | Ju | H01R 43/18 |
| 2023/0057194 A1 * | 2/2023 | Wang | H01R 12/725 |
| 2023/0122513 A1 * | 4/2023 | Wang | H01R 13/6471 439/607.05 |

FOREIGN PATENT DOCUMENTS

| | | | |
|---|---|---|---|
| CN | 104538797 B * | 11/2023 | H01R 13/6461 |

* cited by examiner

*Primary Examiner* — Gary F Paumen
(74) *Attorney, Agent, or Firm* — HOWARD M COHN and Associates, LLC

(57) ABSTRACT

The present invention discloses a middle clamping piece and a high-speed connector. The middle clamping piece is provided with a middle clamping piece ground wall, and the middle clamping piece ground wall can be mounted on one side of a first pair of high-speed signal terminals of a first terminal set of the connector, thereby making up for the defect that there is no ground terminal at the outermost side of the first pair of high-speed signal terminals of the first terminal set, enabling the characteristic impedance, return loss, and insertion loss of the high-speed signal terminals to be better controlled, and enabling a better differential mode impedance and common mode impedance. Besides, the index of the time delay difference of a single signal in a single pair of differences can also be improved, so that the first pair of high-speed signal terminals can have better signal integrity performance.

17 Claims, 6 Drawing Sheets

MIDDLE CLAMPING PIECE AND HIGH-SPEED CONNECTOR

TECHNICAL FIELD

The present invention relates to the technical field of electrical connectors, and more particularly to a middle clamping piece and a high-speed connector.

BACKGROUND ART

Electrical connectors may transmit electrical currents or signals. Common electrical connectors are USB connectors, Type-C connectors, DP connectors (also known as display port high-definition video audio/video interfaces), etc. Among them, the existing DP connectors are generally provided with components such as a plastic cement main body, a first terminal set, a second terminal set, a middle clamping piece, and a metal housing, which can improve the impedance and crosstalk of the connectors in high frequency and high speed through the middle clamping piece and reduce interference. However, the production of such DP connectors basically defines the corresponding functions of the terminals according to the standard specification unified by the international connector associations. In terms of impedance, since each connector manufacturer is limited by the thinking of the association standards, only the existing high-speed signal terminals have been optimized. According to the association standards, the outer side of the first pair of high-speed signal terminals of the existing DP connectors will not be provided with a terminal for grounding, leading to a lack of a reference ground. Such an arrangement can only enable the first pair of high-speed signal terminals to refer to a remote metal housing as a ground. In this way, the characteristic impedances of the first pair of high-speed signal terminals are very difficult to control, and there are some disadvantages in terms of external signal interference and self-generated partial interference, and there is still room for improvement in signal transmission performance and transmission quality.

SUMMARY OF THE INVENTION

It is an object of the present invention to overcome the above-described deficiencies of the prior art and to provide a middle clamping piece and a high-speed connector that can compensate for the absence of a ground terminal on the outermost side of the first pair of high-speed signal terminals of a first terminal set, provide better control of the characteristic impedance of the high-speed signal terminals, and greatly improve signal integrity performance.

To achieve the above object, the first aspect of the present invention provides a middle clamping piece including a middle clamping piece body. The middle clamping piece body is provided with a ground contact part for contacting a ground terminal of a connector, the middle clamping piece body is provided with a middle clamping piece ground wall arranged on the outer side of a high-speed signal terminal of the connector, and the middle clamping piece ground wall protrudes from the surface of the middle clamping piece body and is capable of serving as a reference ground for the high-speed signal terminal of the connector.

The middle clamping piece ground wall is formed by bending a margin portion of one edge of the middle clamping piece body.

One edge or two edges of the middle clamping piece body is provided with a housing contact part for contacting a metal housing of the connector, and a connecting portion between the housing contact part and a margin of the middle clamping piece body on a same side as the middle clamping piece ground wall is bent and raised.

The ground contact part of the middle clamping piece body is arranged as a spring piece structure; the middle clamping piece body is provided with two hollowed-out areas; a first middle clamping piece body connecting strip is formed between the two hollowed-out areas; one side of a second hollowed-out area is formed with a second middle clamping piece body connecting strip located at a tail part of the middle clamping piece body; and the ground contact part is respectively connected to two side edges of the first middle clamping piece body connecting strip and one side edge of the second middle clamping piece body connecting strip facing the second hollowed-out area.

A middle clamping piece positioning hole is provided on the housing contact part of the middle clamping piece body, and a middle clamping piece limiting hole is provided on a head end margin of the middle clamping piece body.

According to the second aspect of the present invention, there is provided a high-speed connector, including an insulating main body, a first terminal set, a second terminal set, a middle clamping piece, and a metal housing, wherein the insulating main body is mounted inside the metal housing, and the first terminal set, the second terminal set, and the middle clamping piece are connected to the insulating main body; the middle clamping piece is located between the first terminal set and the second terminal set, the first terminal set and the second terminal set are respectively provided with a high-speed signal terminal and a ground terminal, and each two high-speed signal terminals form one pair; the ground terminal in the first terminal set is located between two adjacent pairs of high-speed signal terminals and on an outer side of a last pair of high-speed signal terminals; the ground terminal in the second terminal set is located at two sides of each pair of high-speed signal terminals, a middle clamping piece body of the middle clamping piece is provided with a ground contact part in contact with the ground terminal in the first terminal set and/or the ground terminal in the second terminal set, one edge or two edges of the middle clamping piece body of the middle clamping piece is provided with a housing contact part extending out of a side face of the insulating main body and in contact with the metal housing, and the middle clamping piece body of the middle clamping piece is provided with a middle clamping piece ground wall arranged on an outer side of a first pair of high-speed signal terminals of the first terminal set; and the middle clamping piece ground wall protrudes from a surface of the middle clamping piece body towards the first terminal set and is capable of serving as a reference ground for the first pair of high-speed signal terminals of the first terminal set.

The middle clamping piece ground wall is formed by bending a margin portion of one edge of the middle clamping piece body towards the first terminal set.

The middle clamping piece ground wall is parallel to the first pair of high-speed signal terminals of the first terminal set.

A length of the middle clamping piece ground wall is greater than a length of a terminal abutment part of the high-speed signal terminal exposed on a surface of a tongue plate of the insulating main body.

An end of the middle clamping piece ground wall protrudes out of a surface of a tongue plate of the insulating main body, and a height at which the end of the middle clamping piece ground wall protrudes out of the surface of the tongue plate of the insulating main body is equal to or greater than a height at which a terminal abutment part of the high-speed signal terminal protrudes out of the surface of the tongue plate of the insulating main body.

A connecting portion between the housing contact part and a margin of the middle clamping piece body on a same side as the middle clamping piece ground wall is bent and raised towards the first terminal set.

The ground contact part of the middle clamping piece body is provided in a spring piece structure, the ground contact part in contact with the ground terminal in the first terminal set protrudes towards the first terminal set, and the ground contact part in contact with the ground terminal in the second terminal set protrudes towards the second terminal set.

The middle clamping piece body is provided with two hollowed-out areas, a first middle clamping piece connecting strip is formed between the two hollowed-out areas, one side of a second hollowed-out area is formed with a second middle clamping piece connecting strip located at a tail part of the middle clamping piece body, and the ground contact part is respectively connected to two side edges of the first middle clamping piece connecting strip and one side edge of the second middle clamping piece connecting strip facing the second hollowed-out area.

A middle clamping piece positioning hole is provided on the housing contact part of the middle clamping piece body, and an insulating main body through-hole in communication with the middle clamping piece positioning hole is provided on the insulating main body.

A head end margin of the middle clamping piece body is provided with a middle clamping piece limiting hole.

The insulating main body comprises a first terminal insulating seat, a second terminal insulating seat, and a main insulating seat, the first terminal insulating seat is integrally injection-moulded with the first terminal set, the second terminal insulating seat is integrally injection-moulded with the second terminal set, an insulating seat positioning insertion hole is provided on the first terminal insulating seat, and an insulating seat positioning insertion post is provided on the second terminal insulating seat; when the first terminal insulating seat is assembled with the second terminal insulating seat, the insulating seat positioning insertion post is inserted into the insulating seat positioning insertion hole; and the main insulating seat is connected to the first terminal insulating seat and the second terminal insulating seat by secondary injection molding.

A tail end of the metal housing is provided with a housing positioning pin.

Two sides of the head end of the metal housing are respectively provided with ground fixed seats, and the ground fixed seats are provided with screw holes.

One corner of the metal housing is provided as an inclined chamfer.

Compared with the prior art, the beneficial effects of the present invention are as follows.

The middle clamping piece of the present invention is provided with a middle clamping piece ground wall; the middle clamping piece ground wall can be mounted on one side of the first pair of high-speed signal terminals of the first terminal set of the connector, which is equivalent to adding one ground terminal to one side of the first pair of high-speed signal terminals of the first terminal set, so as to make up for the defect that there is no ground terminal on the outermost side of the first pair of high-speed signal terminals of the first terminal set; and the middle clamping piece ground wall is closer to the first pair of high-speed signal terminals of the first terminal set than the previous solution of referring to the metal housing with a relatively long distance. Adding the middle clamping piece ground wall can enable the characteristic impedance, return loss, and insertion loss of the high-speed signal terminals to be better controlled, and enable a better differential mode impedance and common mode impedance. Besides, the index of the time delay difference of a single signal in a single pair of differences can also be improved, so that the first pair of high-speed signal terminals can have better signal integrity performance.

Under the cooperation of the middle clamping piece ground wall on one side of the first pair of high-speed signal terminals of the first terminal set and the ground terminal on the other side, the middle clamping piece can wrap the high-speed signal terminal with better EMI (electromagnetic interference) and EMC (electromagnetic compatibility) performances.

The middle clamping piece ground wall of the present invention can be formed by bending a margin portion of one edge of the middle clamping piece in the direction of the first terminal set, i.e. part of the margin portion of the middle clamping piece is rolled up to form a raised wall surface structure, making the preparation simpler and enabling great reduce in costs.

DETAILED DESCRIPTION OF THE INVENTION

Embodiment 1

Figure 9:
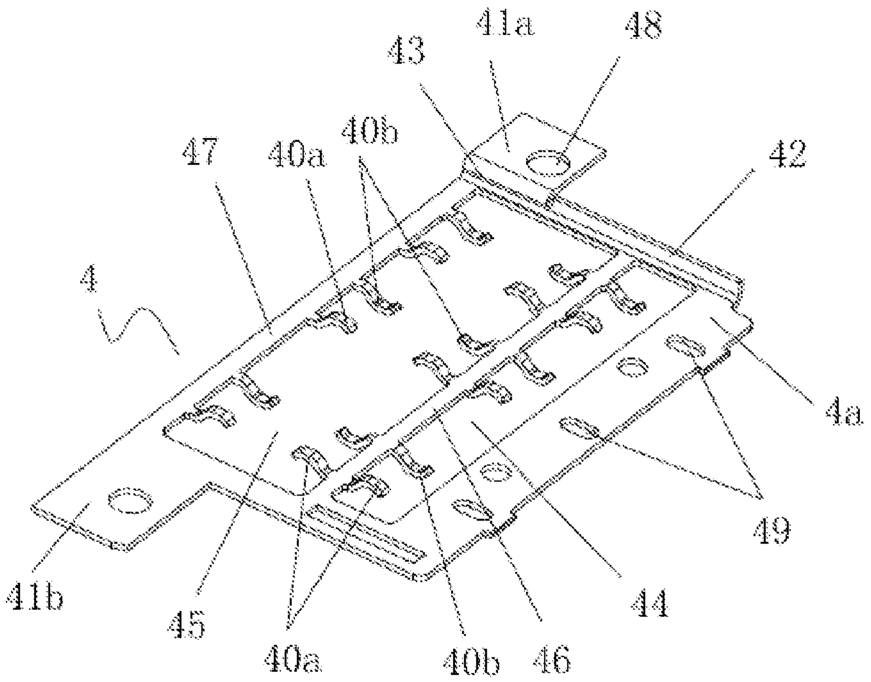
FIG. 9 is a schematic view of the structure of a middle clamping piece.

Referring to FIG. 9, embodiment 1 of the present utility model provides a middle clamping piece 4, including a middle clamping piece body **4*a*, two sides of the middle clamping piece body 4*a* being provided with a housing contact part 41*a* and a housing contact part 41*b*** for contacting a metal housing of a connector.

As shown in FIG. 9, the middle clamping piece body **4*a* is provided thereon with a ground contact part 40*a* for contacting the ground terminal 22 in a first terminal set 2 of the connector and a ground contact part 40*b* for contacting the ground terminal 32 in a second terminal set 3 of the connector. Both the ground contact part 40*a* and the ground contact part 40***b* of the middle clamping piece can be provided in a spring piece structure.

This embodiment uses a spring piece design to facilitate the stable connection between the middle clamping piece and the ground terminal of the connector, avoiding poor contact.

As shown in FIG. 9, a hollowed-out area 44 and a hollowed-out area 45 can be provided on the middle clamping piece body 4*a*, a first middle clamping piece connecting strip 46 is formed between the hollowed-out area 44 and the hollowed-out area 45, a second middle clamping piece connecting strip 47 located at the tail part of the middle clamping piece 4 is formed on one side of the hollowed-out area 45, and the ground contact part 40*a* and the ground contact part 40*b* can be respectively connected to two side edges of the first middle clamping piece connecting strip 46 and one side edge of the second middle clamping piece connecting strip 47 facing the hollowed-out area 45.

As a further improvement of this embodiment, as shown in FIG. 9, the middle clamping piece body 4*a* is provided with a middle clamping piece ground wall 42 for the placement on the outer side of the high-speed signal terminal of the connector, and the middle clamping piece ground wall 42 protrudes above the surface of the middle clamping piece body 4*a* and is capable of serving as a reference ground for the high-speed signal terminal of the connector.

In the specific preparation, the middle clamping piece ground wall 42 can be formed by bending a margin portion of one edge of the middle clamping piece body 4*a*, namely, part of the margin portion of the middle clamping piece body 4*a* is rolled up to form a raised wall surface structure, making the preparation simpler and enabling the cost to be greatly reduced. Of course, according to actual requirements, in other embodiments, the middle clamping piece ground wall 42 may be formed by other processes (such as tearing).

As a further improvement of this embodiment, as shown in FIG. 9, the connecting portion 43 between the housing contact part 41*a* and the margin of the middle clamping piece body 4*a* on the same side as the middle clamping piece ground wall 42 may also bend and protrude toward the first terminal set 2, so that a second wall surface structure may be formed on the same side of the middle clamping piece ground wall 42. When the connecting portion 43 is raised, the housing contact part 41*a* also protrudes from the surface of the middle clamping piece body 4*a*.

As shown in FIG. 9, the housing contact part 41*a* and the housing contact part 41*b* of the middle clamping piece 4 may be further provided with a middle clamping piece positioning hole 48, respectively, which facilitates the positioning of the middle clamping piece 4 in an injection mold. The head end margin of the middle clamping piece body 4*a* of the middle clamping piece 4 is further provided with a middle clamping piece limiting hole 49, the purpose of which is to enable the plastic cement material of the insulating main body of the connector to enter the middle clamping piece limiting hole 49 for solidification, thereby playing a limiting role and strengthening the connecting strength between the middle clamping piece and the insulating main body.

Embodiment 2

Figure 1:
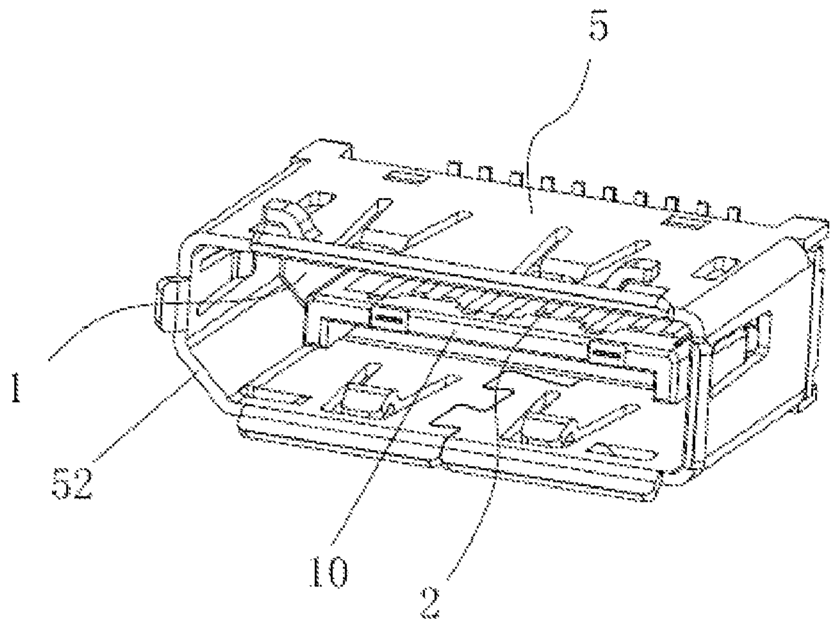
FIG. 1 is schematic view 1 of the structure of a high-speed connector.
Figure 2:
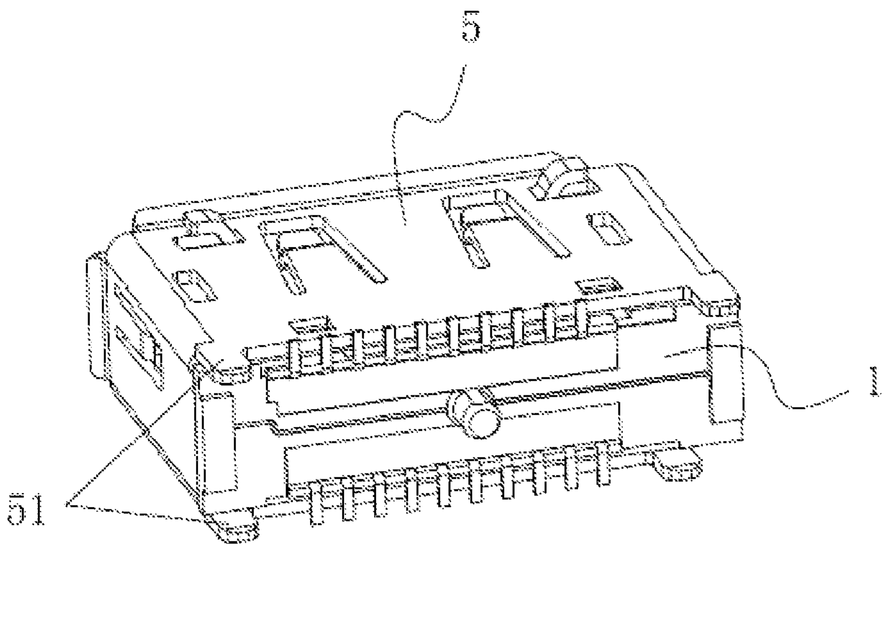
FIG. 2 is schematic view 2 of the structure of a high-speed connector.

Referring to FIGS. 1 and 2, embodiment 2 of the present invention provides a high-speed connector, which is preferably provided as a DP connector including an insulating main body 1, a first terminal set 2, a second terminal set 3, a middle clamping piece 4, and a metal housing 5. Below, a detailed explanation of each component of this embodiment will be provided in conjunction with the accompanying drawings.

Figure 3:
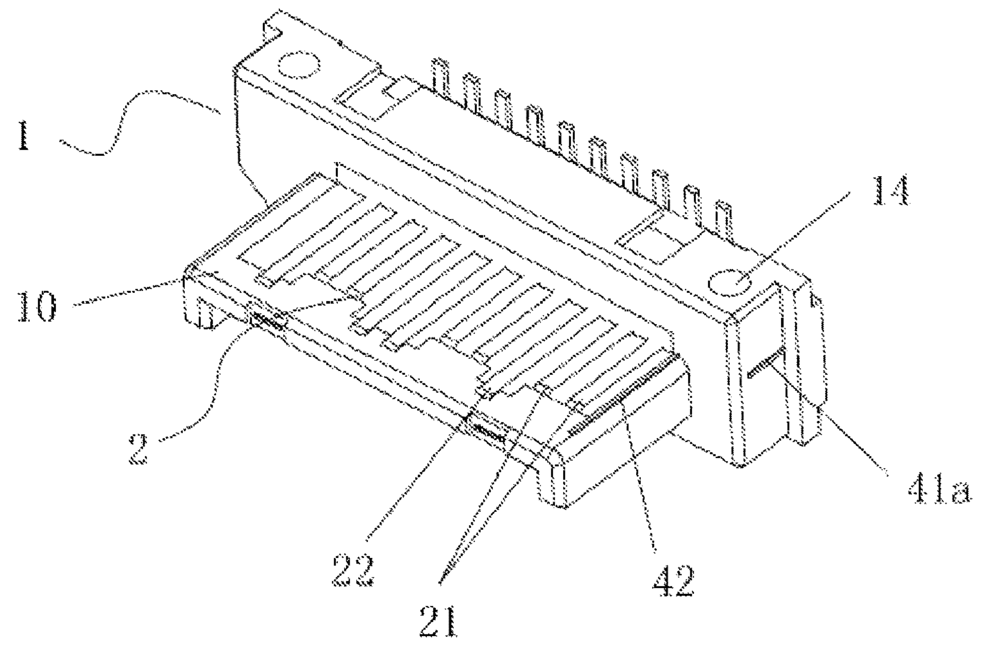
FIG. 3 is a schematic view of the internal structure of a high-speed connector.
Figure 4:
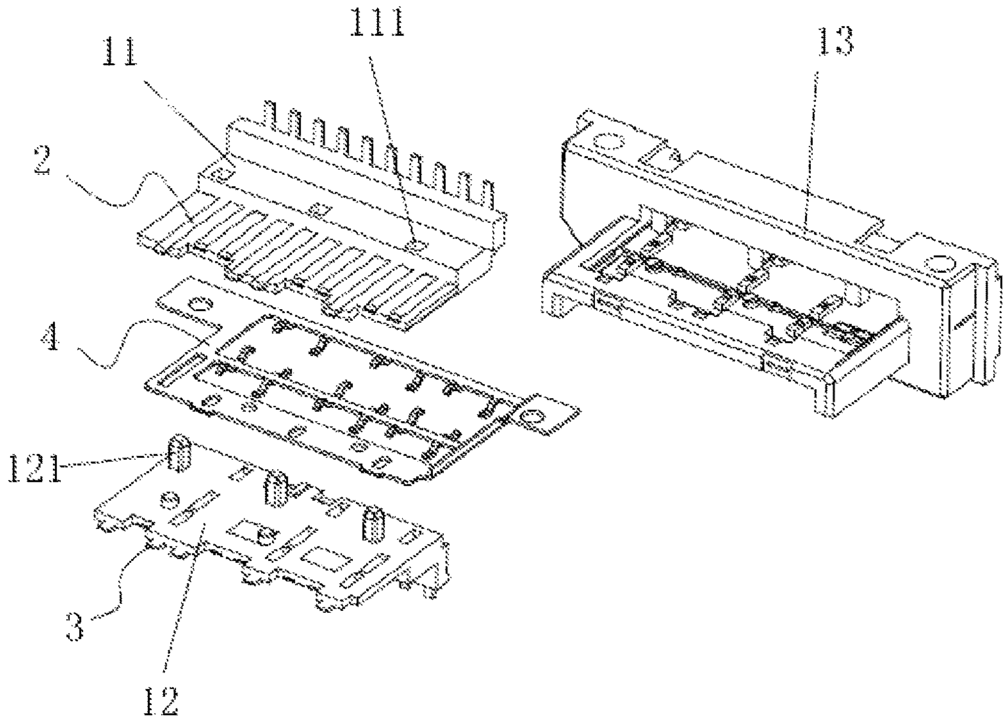
FIG. 4 is an exploded view of the internal structure of a high-speed connector.

As shown in FIGS. 1, 3, and 4, the insulating main body 1 is mounted inside the metal housing 5. The first terminal set 2, the second terminal set 3, and the middle clamping piece 4 are all connected to the insulating main body 1, and the insulating main body 1 can be made of a plastic cement material. When the specific preparation is performed, preferably, the insulating main body 1 can include a first terminal insulating seat 11, a second terminal insulating seat 12, and a main insulating seat 13; the first terminal insulating seat 11 can be firstly injection-moulded integrally with the first terminal set 2, and the second terminal insulating seat 12 can be firstly injection-moulded integrally with the second terminal set 3; an insulating seat positioning insertion hole 111 is provided on the first terminal insulating seat 11, and an insulating seat positioning insertion post 121 is provided on the second terminal insulating seat 12; and when the first terminal insulating seat 11 is assembled with the second terminal insulating seat 12, the insulating seat positioning insertion post 121 can be inserted into the insulating seat positioning insertion hole 111, so that the first terminal insulating seat 11 and the second terminal insulating seat 12 can be quickly positioned, facilitating a subsequent secondary injection molding process.

In the present embodiment, the middle clamping piece 4 may be located between the first terminal insulating seat 11 and the second terminal insulating seat 12, and after the first terminal insulating seat 11, the middle clamping piece 4, and the second terminal insulating seat 12 are assembled, the main insulating seat 13 may be connected with the first terminal insulating seat 11 and the second terminal insulating seat 12 by secondary injection molding.

Figure 7:
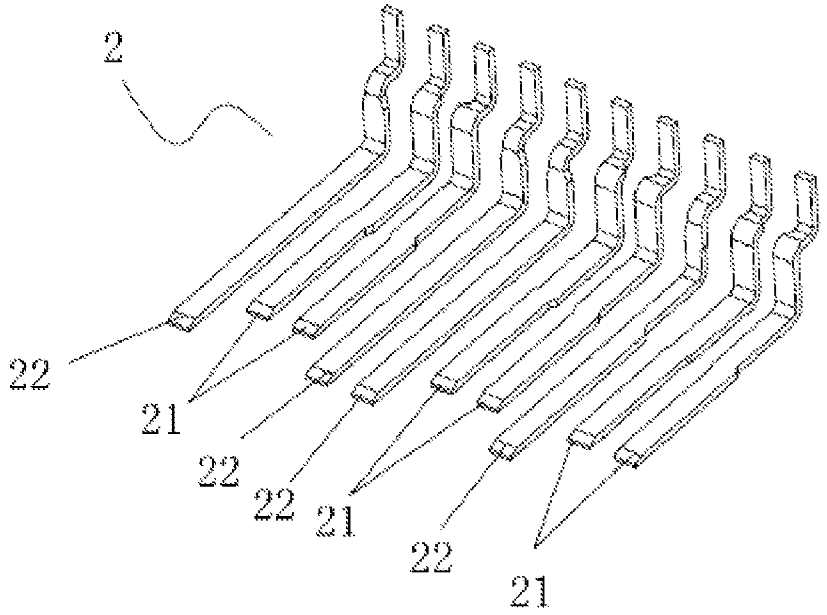
FIG. 7 is a schematic view of the structure of a first terminal set.

As shown in FIG. 7, the first terminal set 2 may be provided with several high-speed signal terminals 21 and several ground terminals 22. Each two high-speed signal terminals 21 constitute a pair, and preferably three pairs are provided. The ground terminals 22 in the first terminal set 2 may be located between two adjacent pairs of the high-speed signal terminals 21 and on the outer side of the last pair of the high-speed signal terminals 21, and the outer side of the first pair of the high-speed signal terminals 21 is not provided with the ground terminals 22. Each of the ground terminals 22 is longer than the high-speed signal terminals 21, and a longer length of the ground terminal 22 can reduce interference of electromagnetic or bad signals to the high-speed signal terminal 21.

Figure 8:
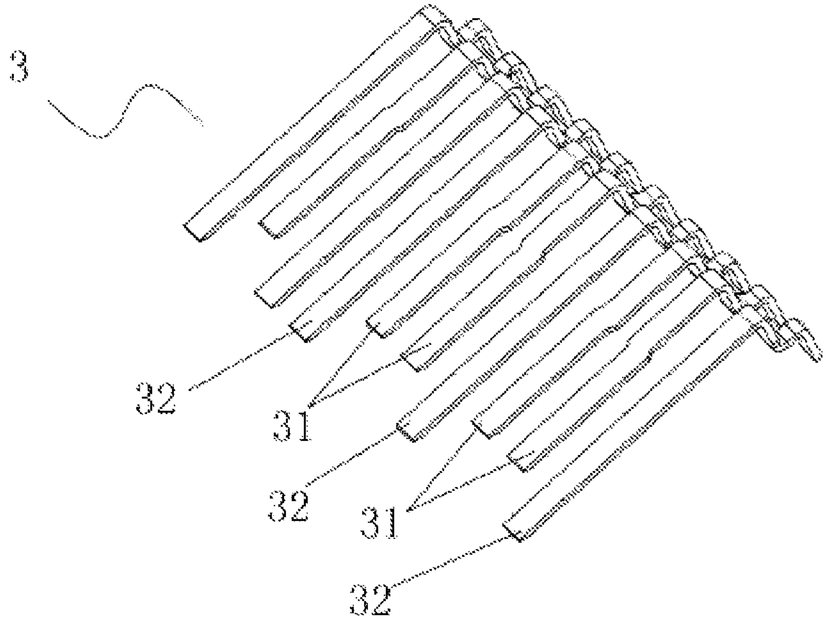
FIG. 8 is a schematic view of the structure of a second terminal set.

As shown in FIG. 8, the second terminal set 3 may be provided with several high-speed signal terminals 31 and several ground terminals 32, and each two high-speed signal terminals 31 constitute a pair, and preferably two pairs are provided; the ground terminals 32 in the second terminal set 3 are located on two sides of each pair of high-speed signal terminals 31; the lengths of each ground terminal 32 are greater than those of the high-speed signal terminals 31; and the ground terminals 32 with a long length can reduce the interference of electromagnetic or bad signals with the high-speed signal terminals 31.

Figure 5:
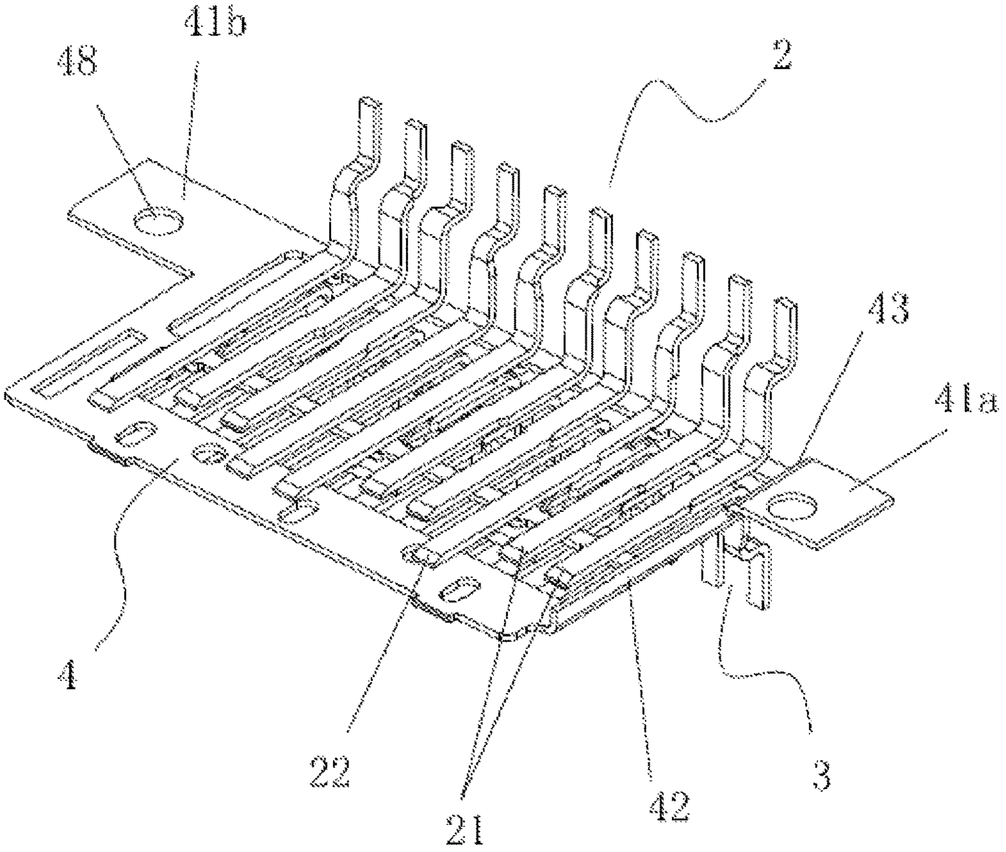
FIG. 5 is a schematic view showing the structure of a terminal set and a middle clamping piece.
Figure 6:
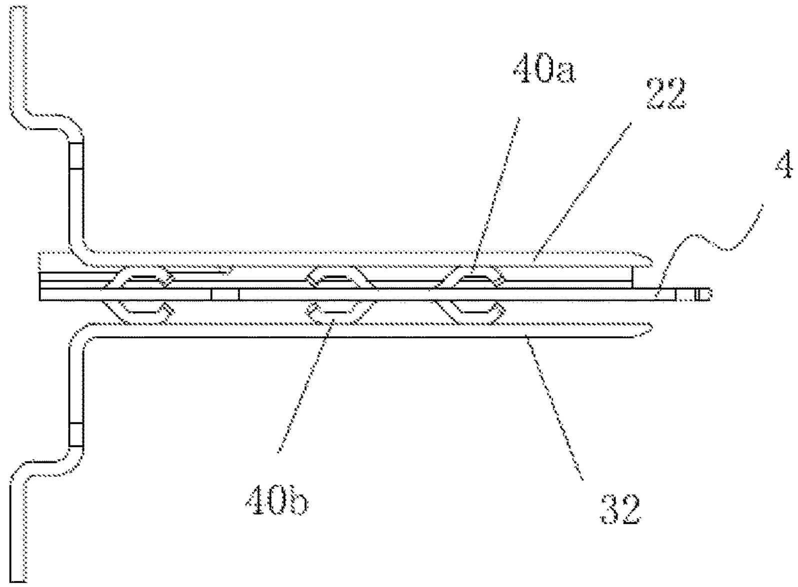
FIG. 6 is a side view of a terminal set and a middle clamping piece.

As shown in FIGS. 5 and 6, the middle clamping piece 4 is located between the first terminal set 2 and the second terminal set 3. The middle clamping piece 4 can block the signals of the first terminal set and the second terminal set from crosstalk with each other, and can send away bad signals through the ground.

As shown in FIGS. 5 and 9, the middle clamping piece body 4*a* of the middle clamping piece 4 is provided on two sides with a housing contact part 41*a* and a housing contact part 41*b* for contacting the metal housing 5, the housing contact part 41*a* and the housing contact part 41*b* respectively protruding out of the side face of the insulating main body 1 (see FIG. 3).

As shown in FIG. 9, the middle clamping piece body 4*a* of the middle clamping piece 4 is provided with a ground contact part 40*a* contacting the ground terminal 22 in the first terminal set 2 and a ground contact part 40*b* contacting the ground terminal 32 in the second terminal set 3. The ground contact part 40*a* and the ground contact part 40*b* of the middle clamping piece 4 can both be arranged in a spring piece structure, the ground contact part 40*a* protrudes towards the first terminal set 2, the ground contact part 40*a* can pass through the through-hole of the first terminal insulating seat 11 to contact the ground terminal 22 in the first terminal set 2, the ground contact part 40*b* protrudes towards the second terminal set 3, and the ground contact part 40*b* can pass through the through-hole of the second terminal insulating seat 12 to contact the ground terminal 32 in the second terminal set 3. This embodiment uses a spring piece design to facilitate the stable connection between the middle clamping piece and the ground terminal, avoiding poor contact.

As shown in FIG. 9, a hollowed-out area 44 and a hollowed-out area 45 can be provided on the middle clamping piece body 4*a* of the middle clamping piece 4, a first middle clamping piece connecting strip 46 is formed between the hollowed-out area 44 and the hollowed-out area 45, a second middle clamping piece connecting strip 47 located at the tail part of the middle clamping piece 4 is formed on one side of the hollowed-out area 45, and the ground contact part 40*a* and the ground contact part 40*b* can be respectively connected to two side edges of the first middle clamping piece connecting strip 46 and one side edge of the second middle clamping piece connecting strip 47 facing the hollowed-out area 45.

As a further improvement of this embodiment, as shown in FIGS. 5 and 9, the middle clamping piece body 4*a* of the middle clamping piece 4 is provided with a middle clamping piece ground wall 42 protruding towards the first terminal set 2, the middle clamping piece ground wall 42 is located on the outer side of the first pair of high-speed signal terminals 21 of the first terminal set 2, and the middle clamping piece ground wall 42 is parallel to the first pair of high-speed signal terminals 21 of the first terminal set 2.

The middle clamping piece ground wall 42 is provided on the outer side of the first pair of high-speed signal terminals 21 of the first terminal set 2 and functions to add one ground terminal to one side of the first pair of high-speed signal terminals 21. The middle clamping piece ground wall 42 is closer to the first pair of high-speed signal terminals 21 of the first terminal set 2 than the first pair of high-speed signal terminals 21 is to the side wall of the metal housing 5.

In the specific preparation, the middle clamping piece ground wall 42 can be formed by bending a margin portion of one edge of the middle clamping piece body 4*a* towards the first terminal set 2, namely, part of the margin portion of the middle clamping piece body 4*a* is rolled up to form a raised wall surface structure, making the preparation simpler and enabling the cost to be greatly reduced. Of course, according to actual requirements, in other embodiments, the middle clamping piece ground wall 42 may also be formed on the outer side of the first pair of high-speed signal terminals 21 by other processes (such as tearing).

Preferably, the length of the middle clamping piece ground wall 42 may be greater than the length of a terminal abutment part of the high-speed signal terminal 21 exposed on the surface of the tongue plate 10 of the insulating main body 1. The head end of the middle clamping piece ground wall 42 extends beyond the head end of the high-speed signal terminal 21 as does the ground terminal 22, which further facilitates the cooperation of the middle clamping piece ground wall 42 with the ground terminal 22 to block electromagnetic or bad signal interference from two sides of the first pair of high-speed signal terminals 21.

As shown in FIG. 3, the end part of the middle clamping piece ground wall 42 protrudes out of the surface of the tongue plate of the insulating main body 1. The height at which the end part of the middle clamping piece ground wall 42 protrudes out of the surface of the tongue plate 10 of the insulating main body 1 may be equal to the height at which the terminal abutment part of the high-speed signal terminal 21 protrudes out of the surface of the tongue plate 10 of the insulating main body 1, namely, the end face of the middle clamping piece ground wall 42 is on the same plane as the surface of the high-speed signal terminal 21. Of course, in other embodiments, the height at which the end part of the middle clamping piece ground wall 42 protrudes out of the surface of the tongue plate 10 of the insulating main body 1 may be greater than the height at which the terminal abutment part of the high-speed signal terminal 21 protrudes out of the surface of the tongue plate 10 of the insulating main body 1.

As a further improvement of this embodiment, as shown in FIGS. 5 and 9, the connecting portion 43 between the housing contact part 401*k* and the margin of the middle clamping piece body 4*a* on the same side as the middle clamping piece ground wall 42 may also bend and protrude toward the first terminal set 2, so that a second wall surface structure may be formed on the same side of the middle clamping piece ground wall 42. When the connecting portion 43 is raised, the housing contact part 41*a* also protrudes from the surface of the middle clamping piece body 4*a*.

As shown in FIG. 9, the housing contact part 41*a* and the housing contact part 41*b* of the middle clamping piece 4 may be further provided with a middle clamping piece positioning hole 48, respectively, which facilitates the positioning of the middle clamping piece 4 in an injection mold. The head end margin of the middle clamping piece body 4*a* of the middle clamping piece 4 is further provided with a middle clamping piece limiting hole 49, the purpose of which is to enable the plastic cement material of the insulating main body 1 to enter the middle clamping piece limiting hole 49 for solidification, thereby playing a limiting role and strengthening the connecting strength between the middle clamping piece 4 and the insulating main body 1.

As shown in FIG. 3, after the injection molding, the insulating main body 1 is left with an insulating main body through-hole 14 communicating with the middle clamping piece positioning hole 48.

As shown in FIGS. 1 and 2, the tail end of the metal housing 5 may be provided with housing positioning pins 51 at the four corners which may be inserted into holes in a PCB board. In addition, one of the corners of the metal housing 5 may also be provided as an inclined chamfer 52 in order to play the role of opposite-insertion fool-proof and avoid mis-insertion.

Figure 10:
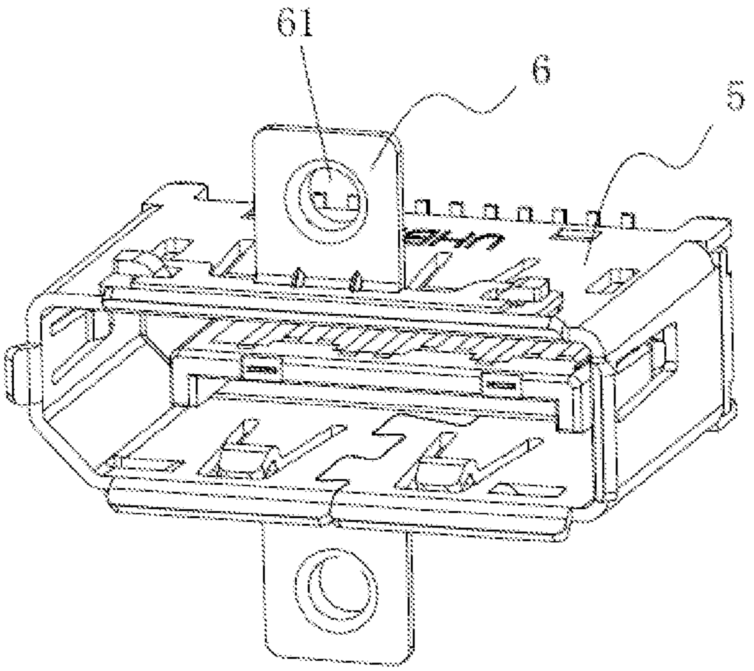
FIG. 10 is a schematic view of the structure of a high-speed connector equipped with a ground fixed seat.

As shown in FIG. 10, in another embodiment, two sides of the head end of the metal housing 5 may be further provided with a ground fixed seat 6 respectively in addition, and the ground fixed seats 6 may be fixedly welded or riveted with the metal housing 5. The ground fixed seat 6 can be provided with a screw hole 61, and the ground fixed seat 6 can be locked on an enclosure of an electronic device by means of a screw so as to join with the ground of the enclosure.

Figure 11:
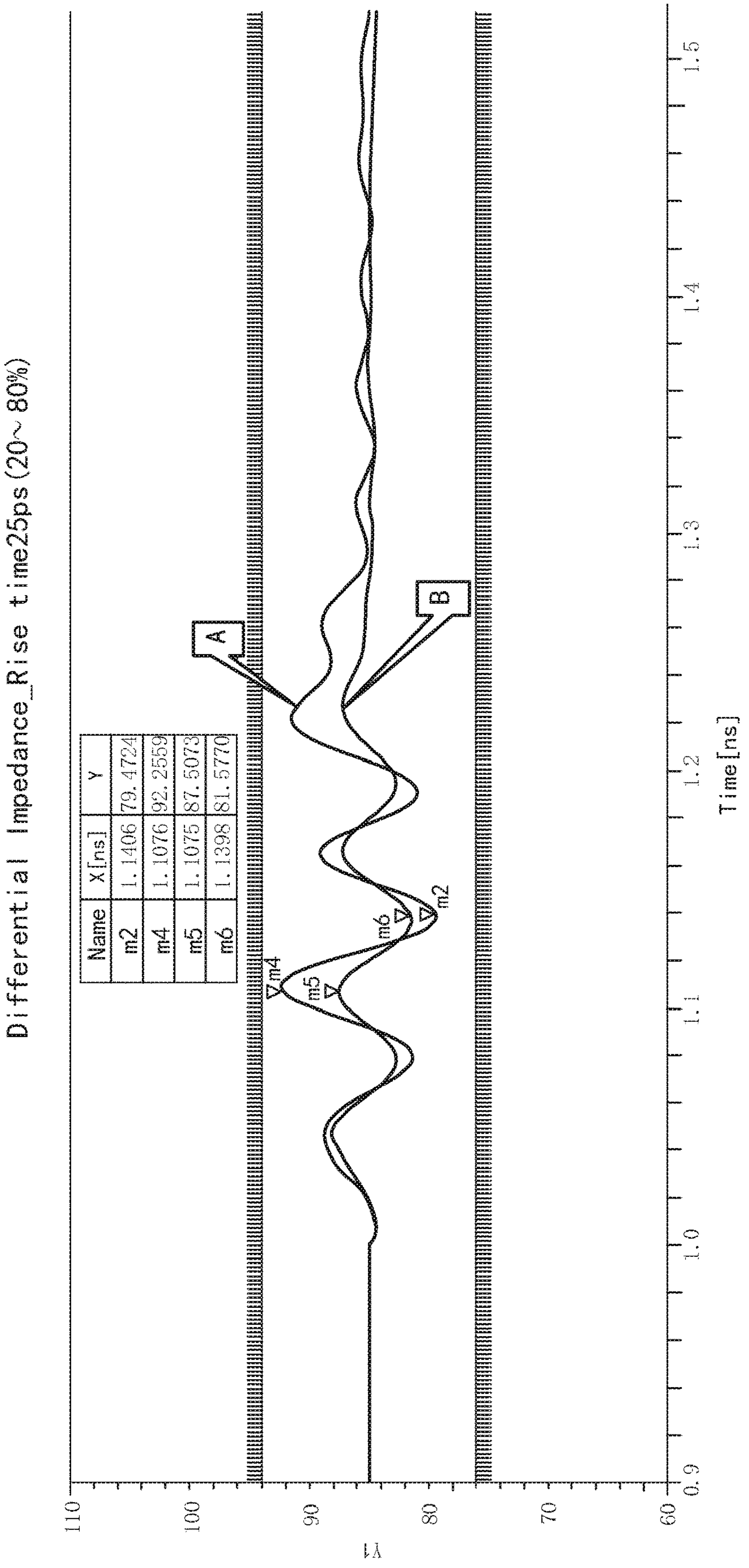
FIG. 11 is a data graph of signal simulation testing of a high-speed connector.

As shown in FIG. 11, curve B represents a conventional DP connector, and curve A represents the high-speed connector of the present embodiment. It can be seen from experimental tests that the impedance of the finished product of the high-speed connector of the present embodiment is 81~87Ω, and the impedance of the finished product of the conventional DP connector is 79~92Ω. It can be seen therefrom that since the middle clamping piece is provided with a middle clamping piece ground wall on the outer side of the first pair of high-speed signal terminals of the first terminal set, the impedance of the high-speed connector of the present embodiment of 85+/−962 is more tend to the middle limiting value of 8552.

In summary, the middle clamping piece of the present invention is provided with a middle clamping piece ground wall (a wall surface structure with a bent protrusion) on one side of the first pair of high-speed signal terminals of the first terminal set, which is equivalent to adding one ground terminal to one side of the first pair of high-speed signal terminals of the first terminal set, so as to make up for the defect that there is no ground terminal on the outermost side of the first pair of high-speed signal terminals of the first terminal set. The middle clamping piece ground wall is closer to the first pair of high-speed signal terminals of the first terminal set than the previous solution of referring to the metal housing with a relatively long distance. Adding a middle clamping piece ground wall can enable the first pair of high-speed signal terminals of the first terminal set to be better coupled, so that the characteristic impedance of the high-speed signal terminals can be better controlled (namely, the characteristic impedance can be controlled with a smaller tolerance range); the return loss and insertion loss can also be better controlled, and better differential mode impedance and common mode impedance can be provided; and the index of the delay inequality of a single signal within a single pair of differences can also be improved, so that the first pair of high-speed signal terminals can have better signal integrity performance.

It needs to be noted herein that the middle clamping piece structure of the present embodiment can be applied to other types of connectors in addition to the DP connector, which is not limited by the present embodiment. Further, the terminals of the connector may be provided as 90-degree terminals or 180-degree terminals.

The embodiments described above are preferred embodiments of the present invention, but the implementation modes of the present invention are not limited to the embodiments described above, and any other changes, modifications, substitutions, combinations, and simplifications made without departing from the spirit and principles of the present invention are to be construed as equivalent substitutions within the protection scope of the present invention.

The invention claimed is:

1. A middle clamping piece comprising a middle clamping piece body, wherein the middle clamping piece body is provided thereon with a ground contact part for contacting a ground terminal of a connector, the middle clamping piece body is provided with a middle clamping piece ground wall for being arranged on an outer side of a high-speed signal terminal of the connector, and the middle clamping piece ground wall protrudes from a surface of the middle clamping piece body and can serve as a reference ground for the high-speed signal terminal of the connector;

wherein the ground contact part of the middle clamping piece body is arranged as a spring piece structure; the middle clamping piece body is provided with two hollowed-out areas; a first middle clamping piece body connecting strip is formed between the two hollowed-out areas; one side of a second hollowed-out area is formed with a second middle clamping piece body connecting strip located at a tail part of the middle clamping piece body; and the ground contact part is respectively connected to two side edges of the first middle clamping piece body connecting strip and one side edge of the second middle clamping piece body connecting strip facing the second hollowed-out area.

2. The middle clamping piece according to claim 1, wherein the middle clamping piece ground wall is formed by bending a margin portion of one edge of the middle clamping piece body.

3. A middle clamping piece comprising a middle clamping piece body, wherein the middle clamping piece body is provided thereon with a ground contact part for contacting a ground terminal of a connector, the middle clamping piece body is provided with a middle clamping piece ground wall for being arranged on an outer side of a high-speed signal terminal of the connector, and the middle clamping piece ground wall protrudes from a surface of the middle clamping piece body and can serve as a reference ground for the high-speed signal terminal of the connector;

wherein one edge or two edges of the middle clamping piece body is provided with a housing contact part for contacting a metal housing of the connector, and a connecting portion between the housing contact part and a margin of the middle clamping piece body on a same side as the middle clamping piece ground wall is bent and raised;

wherein a middle clamping piece positioning hole is provided on the housing contact part of the middle clamping piece body, and a middle clamping piece limiting hole is provided on a head end margin of the middle clamping piece body.

4. A high-speed connector, comprising an insulating main body, a first terminal set, a second terminal set, a middle clamping piece, and a metal housing, wherein the insulating main body is mounted inside the metal housing, and the first terminal set, the second terminal set, and the middle clamping piece are connected to the insulating main body; the middle clamping piece is located between the first terminal set and the second terminal set, the first terminal set and the second terminal set are respectively provided with a high-speed signal terminal and a ground terminal, and each two high-speed signal terminals form one pair; the ground terminal in the first terminal set is located between two adjacent pairs of high-speed signal terminals; the ground terminal in the second terminal set is located at two sides of each pair of high-speed signal terminals, a middle clamping piece body of the middle clamping piece is provided with a ground contact part in contact with the ground terminal in the first terminal set and/or the ground terminal in the second terminal set, one edge or two edges of the middle clamping piece body is provided with a housing contact part extending out of a side face of the insulating main body and in contact with the metal housing, and the middle clamping piece body is provided with a middle clamping piece ground wall arranged on an outer side of a first pair of high-speed signal terminals of the first terminal set; and the middle clamping piece ground wall protrudes from a surface of the middle clamping piece body towards the first terminal set and is capable of serving as a reference ground for the first pair of high-speed signal terminals of the first terminal set.

5. The high-speed connector according to claim 4, wherein the middle clamping piece ground wall is formed by bending a margin portion of one edge of the middle clamping piece body towards the first terminal set.

6. The high-speed connector according to claim 4, wherein the middle clamping piece ground wall is parallel to the first pair of high-speed signal terminals of the first terminal set.

7. The high-speed connector according to claim 4, wherein a length of the middle clamping piece ground wall is greater than a length of a terminal abutment part of the high-speed signal terminal exposed on a surface of a tongue plate of the insulating main body.

8. The high-speed connector according to claim 4, wherein an end of the middle clamping piece ground wall protrudes out of a surface of a tongue plate of the insulating main body, and a height at which the end of the middle clamping piece ground wall protrudes out of the surface of the tongue plate of the insulating main body is equal to or greater than a height at which a terminal abutment part of the high-speed signal terminal protrudes out of the surface of the tongue plate of the insulating main body.

9. The high-speed connector according to claim 4, wherein a connecting portion between the housing contact part and a margin of the middle clamping piece body on a same side as the middle clamping piece ground wall is bent and raised towards the first terminal set.

10. The high-speed connector according to claim 4, wherein the ground contact part of the middle clamping piece body is provided in a spring piece structure, the ground contact part in contact with the ground terminal in the first terminal set protrudes towards the first terminal set, and the ground contact part in contact with the ground terminal in the second terminal set protrudes towards the second terminal set.

11. The high-speed connector according to claim 4, wherein the middle clamping piece body is provided with two hollowed-out areas, a first middle clamping piece connecting strip is formed between the two hollowed-out areas, one side of a second hollowed-out area is formed with a second middle clamping piece connecting strip located at a tail part of the middle clamping piece body, and the ground contact part is respectively connected to two side edges of the first middle clamping piece connecting strip and one side edge of the second middle clamping piece connecting strip facing the second hollowed-out area.

12. The high-speed connector according to claim 4, wherein a middle clamping piece positioning hole is provided on the housing contact part of the middle clamping piece body, and an insulating main body through-hole in communication with the middle clamping piece positioning hole is provided on the insulating main body.

13. The high-speed connector according to claim 4, wherein a head end margin of the middle clamping piece body is provided with a middle clamping piece limiting hole.

14. The high-speed connector according to claim 4, wherein the insulating main body comprises a first terminal insulating seat, a second terminal insulating seat, and a main insulating seat, the first terminal insulating seat is integrally injection-moulded with the first terminal set, the second terminal insulating seat is integrally injection-moulded with the second terminal set, an insulating seat positioning insertion hole is provided on the first terminal insulating seat, and an insulating seat positioning insertion post is provided on the second terminal insulating seat; when the first terminal insulating seat is assembled with the second terminal insulating seat, the insulating seat positioning insertion post is inserted into the insulating seat positioning insertion hole; and the main insulating seat is connected to the first terminal insulating seat and the second terminal insulating seat by secondary injection molding.

15. The high-speed connector according to claim 4, wherein a tail end of the metal housing is provided with a housing positioning pin.

16. The high-speed connector according to claim 4, wherein two sides of the head end of the metal housing are respectively provided with ground fixed seats, and the ground fixed seats are provided with screw holes.

17. The high-speed connector according to claim 4, wherein one corner of the metal housing is provided as an inclined chamfer.

* * * * *